United States Patent
Kawamoto et al.

(10) Patent No.: US 12,549,040 B2
(45) Date of Patent: Feb. 10, 2026

(54) PERMANENT MAGNET WITH COMPOSITION HAVING METALLIC STRUCTURE WITH CELL PHASE TYPE CRYSTAL AND AVERAGE DISTANCE BETWEEN PLATELET PHASES

(71) Applicant: KABUSHIKI KAISHA TOSHIBA, Tokyo (JP)

(72) Inventors: Takahiro Kawamoto, Kanagawa (JP); Masaya Hagiwara, Kanagawa (JP); Shinya Sakurada, Saitama (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 239 days.

(21) Appl. No.: 18/174,890

(22) Filed: Feb. 27, 2023

(65) Prior Publication Data
US 2024/0048004 A1    Feb. 8, 2024

(30) Foreign Application Priority Data
Jul. 26, 2022  (JP) .................. 2022-118739

(51) Int. Cl.
H02K 1/02    (2006.01)
H02K 7/18    (2006.01)

(52) U.S. Cl.
CPC ............. *H02K 1/02* (2013.01); *H02K 7/1823* (2013.01)

(58) Field of Classification Search
CPC .......... H02K 1/02; H02K 1/27; H02K 1/2706; H02K 1/2713; H02K 1/272; H02K 1/1726;
(Continued)

(56) References Cited

U.S. PATENT DOCUMENTS 6,387,294 B1 *  5/2002  Yamashita ............... H02K 1/02
                                                    252/62.55
2002/0054825 A1  5/2002  Sukaki et al.
(Continued)

FOREIGN PATENT DOCUMENTS

JP    H3-198302 A    8/1991
JP    2002-83705 A   3/2002
(Continued)

OTHER PUBLICATIONS

R. Gopalan et al., "Studies on structural transformation and magnetic properties in $Sm_2CO_{17}$ type alloys," J. Mat. Sci., vol. 36, pp. 4117-4123 (2001).

(Continued)

*Primary Examiner* — Maged M Almawri
(74) *Attorney, Agent, or Firm* — Finnegan, Henderson, Farabow, Garrett & Dunner, LLP

(57) ABSTRACT

According to an embodiment, a permanent magnet has a composition represented by a composition formula: $R_pFe_qM_rCu_rCo_{100-p-q-r-t}$ (where, R is at least one element selected from rare earth elements, M is at least one element selected from Zr, Ti, and Hf, p is a number that satisfies 10.0 at %≤p≤14.5 at %, r is a number that satisfies 1.5 at %<r≤4.2 at %, t is a number that satisfies 0.5 at ≤%≤t 9.0 at %, and q is a number that satisfies 17.0 at %≤q≤26.0 at %); and a metallic structure including a cell phase having a $Th_2Zn_{17}$ type crystal phase, a cell wall phase formed so as to partition the $Th_2Zn_{17}$ type crystal phase, and a platelet phase formed so as to intersect with a c-axis of the $Th_2Zn_{17}$ type crystal phase, in which an average distance between the platelet phases is 10 nm or more and 30 nm or less.

11 Claims, 3 Drawing Sheets

(58) Field of Classification Search
CPC .... H02K 1/2733; H02K 1/274; H02K 1/2746;
H02K 1/276; H02K 1/2766; H02K
1/2753; H02K 7/1823; H01F 1/0557;
H01F 1/0596
USPC ........................................ 310/156.01–156.57
See application file for complete search history.

(56) References Cited

U.S. PATENT DOCUMENTS

| | | | | |
|---|---|---|---|---|
| 2008/0303368 | A1* | 12/2008 | Rahman | H02K 1/2766 310/156.56 |
| 2011/0080066 | A1* | 4/2011 | Doi | H02K 1/276 310/156.43 |
| 2012/0080972 | A1* | 4/2012 | Kanada | H02K 1/27 310/156.43 |
| 2012/0299408 | A1* | 11/2012 | Higuchi | H02K 1/32 310/63 |
| 2013/0076184 | A1* | 3/2013 | Horiuchi | C22C 30/02 310/152 |
| 2013/0082559 | A1* | 4/2013 | Hagiwara | H01F 1/0557 310/152 |
| 2013/0127280 | A1* | 5/2013 | Sugimoto | H02K 1/02 310/156.01 |
| 2013/0169098 | A1* | 7/2013 | Chamberlin | H02K 1/02 310/156.01 |
| 2013/0257209 | A1 | 10/2013 | Sakurada et al. | |
| 2014/0054986 | A1* | 2/2014 | Hirai | H02K 9/19 310/53 |
| 2015/0001980 | A1* | 1/2015 | Zhang | H02K 21/16 310/156.43 |
| 2015/0042099 | A1* | 2/2015 | Muniz Casais | H02K 1/2773 290/55 |
| 2015/0147228 | A1 | 5/2015 | Endo et al. | |
| 2015/0194246 | A1* | 7/2015 | Horiuchi | H01F 1/0596 310/152 |
| 2015/0280500 | A1* | 10/2015 | Nigo | F25B 31/02 310/156.53 |
| 2016/0043615 | A1* | 2/2016 | Kayano | H02K 11/25 310/68 B |
| 2017/0271059 | A1* | 9/2017 | Horiuchi | H01F 1/053 |
| 2019/0199151 | A1* | 6/2019 | Loder | H02K 1/02 |

FOREIGN PATENT DOCUMENTS

| | | |
|---|---|---|
| JP | 5586648 B2 | 9/2014 |
| JP | 2014-192253 A | 10/2014 |
| JP | 2017-126757 A | 7/2017 |

OTHER PUBLICATIONS

C. Maury et al., "Genesis of the Cell Microstructure in the Sm (Co, Fe, Cu, Zr) Permanent Magnets with 2:17 Type," Phys. Stat. Sol. (a), vol. 140, p. 57-72 (1993).

* cited by examiner

PERMANENT MAGNET WITH COMPOSITION HAVING METALLIC STRUCTURE WITH CELL PHASE TYPE CRYSTAL AND AVERAGE DISTANCE BETWEEN PLATELET PHASES

CROSS-REFERENCE TO RELATED APPLICATIONS

This application is based upon and claims the benefit of priority from Japanese Patent Application No. 2022-118739 filed on Jul. 26, 2022, and the entire contents of which are incorporated herein by reference.

FIELD

Embodiments described herein relate generally to a permanent magnet, a rotating electric machine, a vehicle, and an aircraft.

BACKGROUND

The permanent magnet is used in products in a wide range of fields including, for example, rotating electric machines such as a motor and a generator, electrical devices such as a speaker and a measurement device, and vehicles such as an automobile and a railway vehicle.

In particular, in recent years, electrification of various moving bodies such as an automobile, an aircraft, and a ship has been promoted, and drive motors used for these moving bodies are required to be reduced in size and weight and to have high output.

When a reduction in size and weight is achieved while maintaining high output, a heat generation density is increased, and a temperature of the motor is easily increased. In particular, when a temperature of the permanent magnet is increased, thermal demagnetization occurs, which leads to a decrease in motor output.

Therefore, in order to achieve both the reduction in size and weight and high output of the motor, it is required to enhance heat resistance of the permanent magnet and suppress thermal demagnetization.

Rare earth magnets such as a Sm—Co-based magnet and a Nd—Fe—B-based magnet are known as examples of high-performance permanent magnets. For example, a permanent magnet in which a part of Nd of a Nd—Fe—B-based magnet is substituted with Dy to improve heat resistance is used. Since Dy is one of rare elements, a permanent magnet that does not use Dy is required. Since the Sm—Co-based magnet has a high Curie temperature, it is known that the Sm—Co-based magnet exhibits excellent heat resistance in a system not using Dy. The Sm—Co-based magnet has attracted attention as a permanent magnet capable of realizing excellent motor characteristics and the like at a high temperature.

In order to increase the output of the motor, it is effective to increase a magnetic flux density of the permanent magnet. In the Sm—Co-based magnet, in order to increase the magnetic flux density, it is effective to substitute a part of Co with Fe and to increase an Fe concentration. However, in a composition region where the Fe concentration is high, there is a problem that a coercive force becomes small and thermal demagnetization is easily to occur, and a permanent magnet that achieves both a high magnetic flux density and a high coercive force is required. The thermal demagnetization is likely to occur at a high temperature of, for example, 200° C.; or higher.

DETAILED DESCRIPTION

Figure 1:
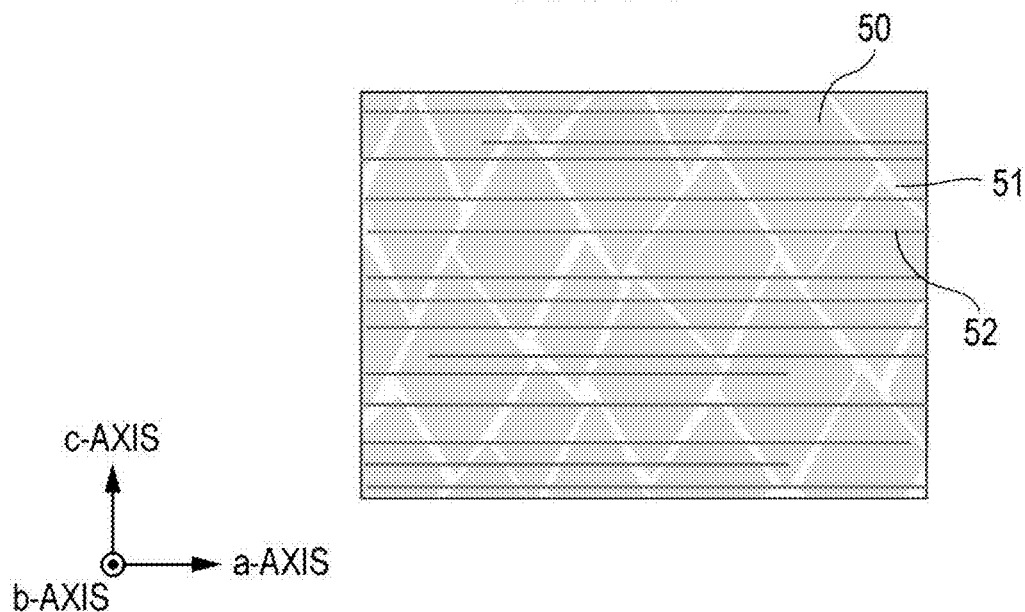
FIG. 1 is a schematic cross-sectional view illustrating a part of a cross section of a sintered body.

Hereinafter, embodiments will be described with reference to the drawings. Note that the drawings are schematic, and for example, a relationship between a thickness and a planar dimension, a ratio of a thickness of each layer, and the like may be actually different from actual ones. In addition, in the embodiments, substantially the same components are denoted by the same reference numerals, and the description thereof will be omitted.

First Embodiment

A permanent magnet of the present embodiment is a permanent magnet having: a composition represented by a composition formula: $R_p Fe_q M_r Cu_t Co_{100-p-q-r-t}$ (where, R is at least one element selected from rare earth elements, M is at least one element selected from Zr, Ti, and Hf, p is a number that satisfies 10.0 at %≤p≤14.5 at %, r is a number that satisfies 1.5 at %<r≤5.0 at %, t is a number that satisfies 0.5 at %≤t≤9.0 at %, and q is a number that satisfies 17.0 at %≤q≤26.0 at %); and a metallic structure including a cell phase having a $Th_2Zn_{17}$ crystal phase, a cell wall phase formed so as to partition the $Th_2Zn_{17}$ crystal phase, and a platelet phase formed so as to intersect with a c-axis of the $Th_2Zn_{17}$ crystal phase, in which an average distance between the platelet phases is 10 nm or more and 30 nm or less.

The element R provides large magnetic anisotropy to the permanent magnet, and imparts a high coercive force to the permanent magnet. As the element R, one or more kinds of rare earth elements are used. As the element R, it is more preferable to use at least one element selected from yttrium (Y), samarium (Sm), cerium (Ce), neodymium (Nd), and praseodymium (Pr), and it is particularly preferable to use Sm. By containing Sm in an amount of 50 at % or more of the element R, the performance of the permanent magnet, particularly the coercive force can be enhanced with excellent reproducibility. Furthermore, it is preferable that Sm is contained in an amount of 70 at % or more of the element R, and more preferably 90 at % or more of the element R.

A content of the element R is, for example, a number that satisfies 10.0 at %≤p≤14.5 at % in the composition formula: $R_p Fe_q M_r Cu_t Co_{100-p-q-r-t}$. When the content of the element R is less than 10.0 at %, a large amount of α-Fe phases is precipitated in the permanent magnet, and a sufficient coercive force cannot be obtained. On the other hand, when the content of the element R exceeds 14.5 at %, a decrease in saturation magnetization is remarkable. The content of the element R is more preferably 10.3 at % or more and 14.0 at % or less, and still more preferably 10.5 at % or more and 13.5 at % or less.

As the element M, at least one element selected from titanium (Ti), zirconium (Zr), and hafnium (Hf) is used. By blending the element M, a large coercive force can be exhibited even when a composition having a high Fe concentration is used. A content r of the element M is, for example, a number that satisfies 1.5 at %<r≤4.2 at % in the composition formula: $R_p Fe_q M_r Cu_t Co_{100-p-q-r-t}$. When the content r of the element M is 1.5 at % or less, the effect of increasing the coercive force is small, and when r exceeds 4.2 at %, a phase excessively containing the element M is generated, and the magnetic properties are easily deteriorated. A content of the element M is preferably 1.6 at % or more and 4.1 at % or less, more preferably 1.7 at % or more and 4.0 at % or less, still more preferably 2.0 at % or more and 3.9 at % or less, and further still more preferably 2.5 at % or more and 3.8 at % or less.

The element M may be any one of Ti, Zr, and Hf, and preferably contains at least Zr. That is, the element M is preferably a combination including only Zr, Zr and Ti, Zr and Hf, and three kinds of Zr, Ti and Hf. In particular, by containing Zr in an amount of 50 at % or more of the element M, the effect of increasing the coercive force of the permanent magnet can be further improved. On the other hand, in the element M, Hf is particularly expensive, and therefore, even in a case where Hf is used, it is preferably to reduce the amount of Hf used.

Copper (Cu) exhibits a high coercive force in the permanent magnet. A content of Cu is, for example, 0.5 at %≤t≤9.0 at % in the composition formula: $R_p Fe_q M_r Cu_t Co_{100-p-q-r-t}$. Since Cu is a non-magnetic element, when Cu exceeds 9.0 at %, the magnetization is significantly decreased. On the other hand, when Cu is less than 0.5 at %, it is difficult to obtain a high coercive force. The content of Cu is preferably 0.6 at % or more and 8.9 at % or less, more preferably 0.7 at % or more and 8.8 at % or less, still more preferably 0.8 at % or more and 8.7 at % or less, still more preferably 0.9 at % or more and 8.6 at % or less, and further still more preferably 1.0 at % or more and 8.5 at % or less.

Iron (Fe) is mainly responsible for the magnetization of the permanent magnet. The saturation magnetization of the permanent magnet can be increased by containing a large amount of Fe. However, when a content of Fe is excessively high, an appropriate cellular structure cannot be formed, and the coercive force is decreased. The content of Fe is, for example, a number that satisfies 17.0 at %≤q≤26.0 at % in the composition formula: $R_p Fe_q M_r Cu_t Co_{100-p-q-r-t}$. The content of Fe is more preferably 17.5 at % or more and 25.8 at % or less, still more preferably 18.0 at % or more and 25.6 at % or less, still more preferably 18.5 at % or more and 25.4 at % or less, still more preferably 19.0 at % or more and 25.2 at % or less, still more preferably 19.5 at % or more and 25.0 at % or less, and further still more preferably 20.0 at % or more and 24.8 at % or less.

Cobalt (Co) is an element that is responsible for the magnetization of the permanent magnet and is required to exhibit a high coercive force. Furthermore, when a large amount of Co is contained, a Curie temperature is increased, and thermal stability of the permanent magnet is also improved. When a blending amount of Co is small, these effects are reduced. However, when Co is excessively contained in the permanent magnet, the content of Fe is relatively reduced, which may cause a decrease in magnetization. A content of Co is in a range (100-p-q-r-t) defined by p, q, r, and t.

A part of Co may be substituted with at least one element A selected from nickel (Ni), vanadium (V), chromium (Cr), manganese (Mn), aluminum (Al), silicon (Si), gallium (Ga), niobium (Nb), tantalum (Ta), and tungsten (W). These substitution elements contribute to improvement of magnet properties, for example, a coercive force. 20 at % or less of Co in the composition formula $R_p Fe_q M_r Cu_t Co_{100-p-q-r-t}$ can be substituted with the element A described above. When more than 20 at % of Co is substituted with the element A, excessive substitution of Co with the element A may cause a decrease in magnetization.

The composition of the permanent magnet can be measured by, for example, an inductively coupled plasma (ICP) spectral analysis method, scanning electron microscope-energy dispersive X-ray spectroscopy (SEM-EDX), transmission electron microscope-EDX (TEM-EDX), scanning transmission electron microscope-energy dispersive X-ray spectroscopy (STEM-EDX), or the like. The composition of the permanent magnet may be measured by selecting one of these methods. The composition of the permanent magnet obtained from these measurement methods means an average composition of the entire permanent magnet.

FIG. 1 is a schematic cross-sectional view illustrating a part of a cross section of a permanent magnet. The permanent magnet of the present embodiment has a phase separation structure formed by subjecting a $TbCu_7$ type crystal phase (a crystalline phase having a $TbCu_7$ type structure, hereinafter, referred to as a 1-7 phase), which is a high-temperature phase, as a precursor, to an aging treatment and the like, that is, a metallic structure including a cell phase 50 having a $Th_2Zn_{17}$ type crystal phase, a cell wall phase 51 formed so as to partition the $Th_2Zn_{17}$ type crystal phase, and a platelet phase 52 formed so as to intersect with a c-axis of the $Th_2Zn_{17}$ type crystal phase. The platelet phase 52 preferably perpendicularly intersects with the c-axis of the $Th_2Zn_{17}$ type crystal phase, and in this case, the perpendicularity may also include a state within ±10 degrees from a perpendicular direction (substantially perpendicular). Each phase is also characterized in terms of composition, the cell wall phase 51 has a higher Cu concentration than the cell phase 50 (main phase), and the platelet phase 52 has a higher concentration of the element M such as Zr than the cell phase 50 (main phase). Note that the metallic structure of the permanent magnet may include a crystal phase or an amorphous phase having a 2-17 phase in addition to the cell phase 50, the cell wall phase 51, and the platelet phase 52.

Examples of the cell wall phase 51 include a 1-5 phase, and are not limited thereto. Examples of the cell wall phase 51 other than the 1-5 phase include a 1-7 phase, which is a high-temperature phase (structure before phase separation) and a precursor phase of the 1-5 phase generated at an initial stage of phase separation of the 1-7 phase.

The platelet phase 52 is a phase containing a plate like element M present so as to cross crystal grains composed of the cell phase 50 and the cell wall phase 51, and is present perpendicular to a c-axis direction of the cell phase 50. Therefore, the platelet phases 52 are observed in parallel in one observation field.

Each phase of the metallic structure is comprehensively determined by using, for example, observation with an electron microscope together with electron beam diffraction analysis, X-ray diffraction analysis, or the like. For example, each of the cell phase 50, the cell wall phase 51, and the platelet phase 52 can be identified by combining an STEM observation image and an element mapping image by STEM-EDX.

Domain wall energy of the cell wall phase precipitated at a grain boundary of the cell phase is larger than domain wall energy of the cell phase, and a difference in domain wall energy becomes a barrier for domain wall displacement. For example, in a $Sm_2Co_{17}$ type magnet, it is considered that a domain wall pinning coercive force is developed by the cell wall phase having a large domain wall energy acting as a pinning site. Here, the difference in domain wall energy is mainly caused by a difference in Cu concentration.

Here, for example, in a case where a cell wall phase having a large domain wall pinning effect and a cell wall phase having a small domain wall pinning effect are generated due to, for example, occurrence of a concentration distribution of Cu in the cell wall phase, the coercive force is decreased. Therefore, it is desirable that the difference in Cu concentration between the cell phase and the cell wall phase is large, and the concentration distribution (concentration difference) of Cu is small in the cell wall phase.

The difference in Cu concentration between the cell phase and the cell wall phase is caused by interdiffusion of Cu between the cell phase and the cell wall phase with the platelet phase interposed therebetween when the $TbCu_7$ type crystal phase is phase-separated into the cell phase, the cell wall phase, and the platelet phase. Therefore, in a case where the platelet phase is densely generated, for example, the difference in Cu concentration between the cell phase and the cell wall phase is large, and the concentration distribution of Cu is reduced in the cell wall phase, such that the coercive force is increased.

A concentration of the Cu element contained in the cell wall phase is preferably 5 times or more and 25 times or less the concentration of the Cu element contained in the cell phase. The concentration of the Cu element contained in the cell wall phase is more preferably 8 times or more and 22 times or less and still more preferably 10 times or more and 20 times or less the concentration of the Cu element contained in the cell phase. When the Cu concentration in the cell wall phase is less than 5 times the Cu concentration in the cell phase, the effect of increasing the coercive force is weak. In addition, when the Cu concentration in the cell wall phase exceeds 25 times the Cu concentration in the cell phase, it is difficult to stably maintain a crystal structure.

The Cu concentrations in the cell wall phase and the cell phase can be measured by, for example, STEM-EDX, TEM-EDX, composition analysis using a three-dimensional atom probe, or the like. In STEM-EDX, for example, a region of 800 nm×1,200 nm or more and 900 nm×1,300 nm or less is subjected to STEM observation at a magnification of 100 k times. An acceleration voltage is preferably 200 kV. In the observed image, the cell wall phase and the cell phase are identified by STEM-EDX, and the compositions at 10 or more locations are arbitrarily measured and averaged to calculate the Cu concentrations in the cell wall phase and the cell phase in one observed image. The observation is performed at 10 or more locations that do not overlap each other, an average value of values obtained by excluding the maximum value and the minimum value of the average composition calculated in each image is obtained, and this value is taken as the average Cu concentration in the cell wall phase and the cell phase. Note that a cross section of a sample is divided into three equal parts in each of a longitudinal direction and a lateral direction, and a portion that is the center in the longitudinal direction and the lateral direction is used as a cross section of the permanent magnet.

The average distance between the platelet phases is, for example, 10 nm or more and 30 nm or less. When the average distance between the platelet phases exceeds 30 nm, since the platelet phase exists sparsely in the permanent magnet, a proportion of the cell wall phase having a low Cu concentration is increased, and the coercive force is decreased. When the average distance between the platelet phases is less than 10 nm, since the platelet phase becomes dense in the permanent magnet, a proportion of the cell phase and the cell wall phase in the permanent magnet is decreased, and the magnetization is significantly decreased. The average distance between the platelet phases is preferably 12 nm or more and 28 nm or less, more preferably 15 nm or more and 27 nm or less, and still more preferably 20 nm or more and 26 nm or less.

<Method of Measuring Average Distance between Platelet Phases>

The average distance between the platelet phases is measured from a structure observation image of the cross section of the permanent magnet with, for example, STEM, a transmission electron microscope (TEM), a three-dimensional atom probe, or the like. As the cross section of the permanent magnet, a cross section of a substantially central portion of a surface having a maximum area of a sample is used. In STEM, for example, a region of 800 nm×1,200 nm or more and 900 nm×1,300 nm or less is observed at a magnification of 100 k times. An acceleration voltage is preferably 200 kV. In this case, a width direction in the STEM image is a direction perpendicular to the platelet phase, that is, the same direction as the c-axis. Note that the perpendicularity may also include a state within ±10 degrees from a perpendicular direction (substantially perpendicular).

Figure 2:
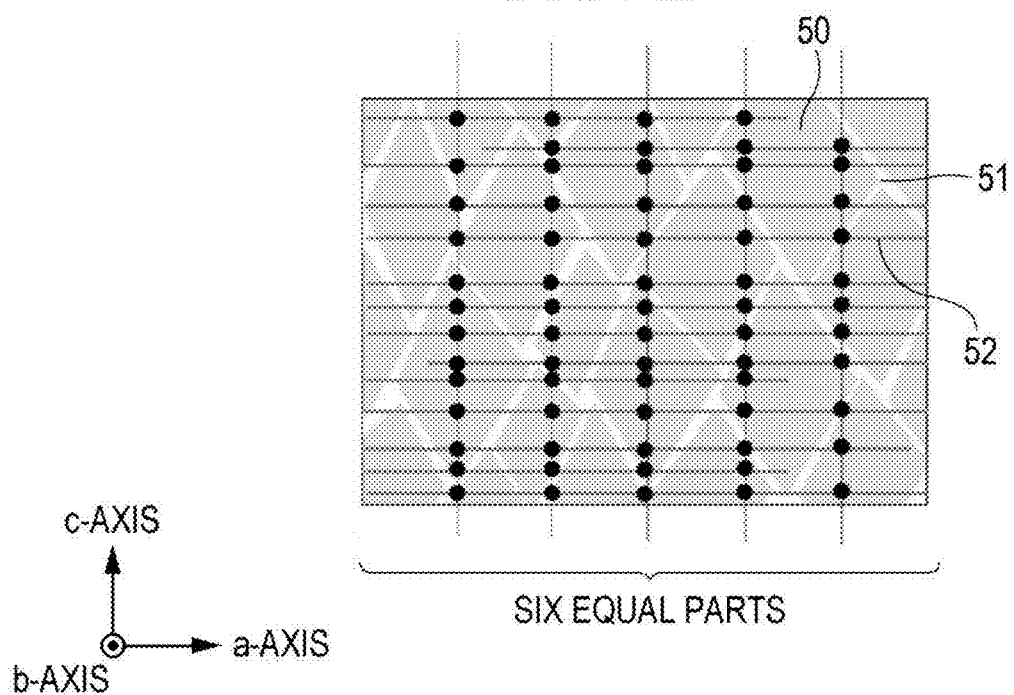
FIG. 2 is a view illustrating a method of measuring a distance between platelet phases in the sintered body.

Here, a method of measuring the average distance between the platelet phases will be described with reference to FIG. 2. In the observed STEM image, dividing equally into six in an a-axis direction or a b-axis direction, five lines that have the same lengths in a c-axis direction in the STEM image are drawn at equal intervals, and intersection points of the line in the c-axis direction and the platelet phase are counted. For example, in FIG. 2, the intersection points of the leftmost line and the platelet phase are 13 points. The length in the c-axis direction in the STEM image is divided by the intersection points (the length in the c-axis direction/number of the intersection points in the STEM image) to calculate the average distance between the platelet phases for each line. Thereafter, the distances between the platelet phases on the five lines described above are averaged and taken as the average distance between the platelet phases in one observation image. The observation is performed at 10 or more locations that do not overlap each other, an average value of values obtained by excluding the maximum value and the minimum value of the average distance calculated in each image is obtained, and this value is taken as the average distance between the platelet phases.

<Method of Measuring Magnet Properties Such As Coercive Force and Residual Magnetization of Permanent Magnet>

The magnet properties such as a coercive force and residual magnetization of the permanent magnet are calculated using, for example, a direct-current fluxmeter (BH-Tracer) or a vibrating sample magnetometer (VSM). A measurement temperature can be controlled by incorporating a heating mechanism such as a heater, incorporating a thermostatic bath, or the like.

Next, an example of a method of manufacturing a permanent magnet will be described.

<Method of Manufacturing Permanent Magnet>

First, an alloy powder containing a predetermined element required for synthesis of a permanent magnet is prepared. For example, an alloy powder can be prepared by grinding an alloy ingot obtained by casting a molten metal by an arc melting method or a high frequency melting method. The alloy powder may have a desired composition by mixing a plurality of powders having different compositions.

Examples of other methods of preparing the alloy powder include a mechanical alloying method, a mechanical grinding method, a gas atomization method, and a reduction diffusion method. The uniformity of the alloy powder can be improved by using a strip casting method. Furthermore, it is possible to homogenize the alloy powder or the alloy material before being ground by subjecting the alloy powder or the alloy material to a heat treatment. For example, the material can be ground using a jet mill, a ball mill, or the like. Note that oxidation of the powder can be prevented by grinding the material in an inert gas atmosphere or an organic solvent.

An average particle size of the powder after grinding is preferably 1 μm or more and 10 μm or less. The average particle size of the powder after grinding is more preferably 3 μm or more and 8 μm or less, and still more preferably 4 μm or more and 7 μm or less. The amount of oxide can be suppressed by setting a proportion of particles having a particle size of 1 μm or less to 1 vol % or less. A porosity of the sintered body prepared after sintering is reduced by setting a proportion of particles having a particle size of 10 μm or more to 2 vol % or less, such that a sufficient density can be realized.

The average particle size of the powder is defined by a value of a particle size (median diameter: d50) at which a cumulative distribution is 50% in a particle size distribution measured by a laser diffraction method or the like. It is preferable to use a jet mill for preparing such a powder.

The obtained fine powder is pressed to obtain a green compact.

Next, the green compact (pressurized powder body) is sintered by a heat treatment at 1,180° C. or higher and 1,250° C. or lower for 0.5 hours or longer and 15 hours or shorter. When the heat treatment temperature is lower than 1,180° C., densification of the sintered body becomes insufficient. When the heat treatment temperature exceeds 1,250° C., the element R such as Sm in the powder is excessively evaporated, and the magnetic properties are deteriorated. For example, the heat treatment temperature is preferably 1,180° C. or higher and 1,220° C. or lower and more preferably 1,190° C. or higher and 1,210° C. or lower.

When the heat treatment time is shorter than 0.5 hours, the densification of the sintered body becomes insufficient. When the heat treatment time exceeds 15 hours, the element R in the powder is excessively evaporated, and the magnetic properties are deteriorated. The heat treatment time is preferably 1 hour or longer and 10 hours or shorter and more preferably 1 hour or longer and 7 hours or shorter. In the sintering, in order to suppress oxidation, it is preferable to perform a heat treatment in vacuum or in an inert atmosphere such as argon gas.

The obtained sintered body is subjected to a solution heat treatment, and rapidly cooled after the solution heat treatment. The $TbCu_7$ type crystal phase (1-7 phase) as a precursor phase can be made into a single phase by performing the solution heat treatment. The heat treatment is preferably performed in vacuum or in an inert atmosphere such as argon gas. It is preferable that the solution heat treatment temperature is 1,170° C. or higher and lower than 1,220° C. and the solution heat treatment time is 10 hours or longer and 50 hours or shorter. When the solution heat treatment temperature is lower than 1,170° C. or the solution heat treatment time is shorter than 10 hours, the platelet phase is sparsely formed, and the effect of increasing the coercive force is low. When the solution heat treatment temperature is 1,220° C. or higher or the solution heat treatment time exceeds 50 hours, the element R is excessively evaporated, and the coercive force is decreased.

For example, the solution heat treatment temperature is more preferably 1,180° C. or higher and still more preferably 1,190° C. or higher. In addition, the solution heat treatment temperature is more preferably 1,210° C. or lower and still more preferably 1,200° C. or lower. The solution heat treatment time is more preferably 10 hours or longer and 30 hours or shorter.

A high-quality heat treatment may be performed before the solution heat treatment. For example, the heat treatment is performed by holding the sintered body at a temperature lower than the heat treatment temperature during sintering by 10° C. or more and a temperature higher than the heat treatment temperature during the solution heat treatment by 10° C. or more for 4 hours or longer and 30 hours or shorter. By performing the high-quality heat treatment, for example, crystal grains are coarsened and homogenized, and the squareness of the magnetic properties is improved.

The high-quality heat treatment temperature is preferably 1,180° C. or higher and 1,230° C. or lower. When the high-quality heat treatment temperature is too higher than the heat treatment temperature during sintering, a different phase generated from a liquid phase may be generated, which may cause deterioration of the magnetic properties and evaporation of the element R. In a case where the high-quality heat treatment temperature is too low, the progress of diffusion is insufficient and the effect cannot be obtained.

By performing rapid cooling to room temperature after the solution heat treatment, the $TbCu_7$ type crystal phase can be stabilized, and the coercive force is easily exhibited. When a cooling rate is low, a $Ce_2Ni_7$ type crystal phase or a $Th_2Zn_{17}$ type crystal phase is likely to be generated during cooling.

Next, the sintered body after the solution heat treatment is subjected to an aging treatment to form a phase separation structure. In the aging treatment, it is preferable that a heat treatment is performed at a temperature of 700° C. or higher and 900° C. or lower for 10 hours or longer and 100 hours or shorter, slow cooling is performed at a cooling rate of 0.1° C./min or more and 5° C./min or less to a temperature of 20° C. or higher and 600° C. or lower, and then cooling is performed to room temperature (for example, 25° C.). The coercive force and the like of the permanent magnet having the phase separation structure can be improved by performing the aging treatment under such conditions. It is preferable that the aging treatment is performed in vacuum or in an inert gas atmosphere such as argon gas to prevent oxidation.

When the aging treatment temperature is lower than 700° C. or higher than 900° C., a homogeneous mixed structure of the cell phase and the cell wall phase cannot be obtained, and the magnetic properties of the permanent magnet may be deteriorated. The aging treatment temperature is preferably 750° C. or higher and 880° C. or lower and more preferably 780° C. or higher and 850° C. or lower.

When the aging treatment time is shorter than 10 hours, the cell wall phase may not be sufficiently formed or element diffusion may be insufficient. On the other hand, when the holding time exceeds 100 hours, a volume fraction of the cell phase is decreased due to an increase in thickness of the cell wall phase, and excellent magnetic properties may not be obtained. The aging treatment time is more preferably 10 hours or longer and 90 hours or shorter, and still more preferably 20 hours or longer and 80 hours or shorter.

When the cooling rate during slow cooling is less than 0.1° C./min, productivity may be reduced and cost may be increased. When the cooling rate during slow cooling exceeds 5° C./min, a homogeneous mixed structure of the cell phase and the cell wall phase cannot be obtained, and the magnetic properties of the permanent magnet may be deteriorated. The cooling rate after the aging treatment is preferably 0.3° C./min or more and 4° C./min or less and more preferably 0.5° C./min or more and 3° C./min or less.

Prior to the aging treatment, a preliminary aging treatment in which a heat treatment is performed at a temperature lower than the aging heat treatment temperature may be performed. In the preliminary aging treatment, it is preferable that a heat treatment is performed at a temperature of 500° C. or higher and 900° C. or lower for 0.5 hours or longer and 10 hours or shorter, and then slow cooling is performed at a cooling rate of 0.1° C./min or more and 5° C./min or less to a temperature of 20° C. or higher and 450° C. or lower. The squareness of the magnetic properties can be improved by performing the preliminary aging treatment.

From the above, the permanent magnet according to the present embodiment is a permanent magnet having: a composition represented by a composition formula: $R_p Fe_q M_r Cu_t Co_{100-p-q-r-t}$ (where, R is at least one element selected from rare earth elements, M is at least one element selected from Zr, Ti, and Hf, p is a number that satisfies 10.0 at %≤p≤14.5 at %, r is a number that satisfies 1.5 at %<r≤5.0 at %, t is a number that satisfies 0.5 at %≤t≤9.0 at %, and q is a number that satisfies 17.0 at %≤q≤26.0 at %); and a metallic structure including a cell phase having a $Th_2Zn_{17}$ type crystal phase, a cell wall phase formed so as to partition the $Th_2Zn_{17}$ type crystal phase, and a platelet phase formed so as to intersect with a c-axis of the $Th_2Zn_{17}$ type crystal phase, in which an average distance between the platelet phases in a structure of the permanent magnet is 10 nm or more and 30 nm or less. Therefore, the permanent magnet can achieve both high residual magnetization and a high coercive force at a high temperature.

Second Embodiment

The permanent magnet of the first embodiment can be used for rotating electric machines such as various motors and generators included in automobiles, railway vehicles, aircrafts, and the like. In addition, it can also be used as a fixed magnet or a variable magnet of a variable magnetic flux motor or a variable magnetic flux generator. Various motors and generators are configured by using the permanent magnet of the first embodiment. In a case where the permanent magnet of the first embodiment is applied to a variable magnetic flux motor, a known technique can be appropriately applied to a configuration or a drive system of the variable magnetic flux motor.

Hereinafter, a rotating electric machine including the permanent magnet according to the first embodiment, and a vehicle and an aircraft including the rotating electric machine will be described. The rotating electric machine is, for example, a permanent magnet motor or a generator.

[A] Permanent Magnet Motor

Figure 3:
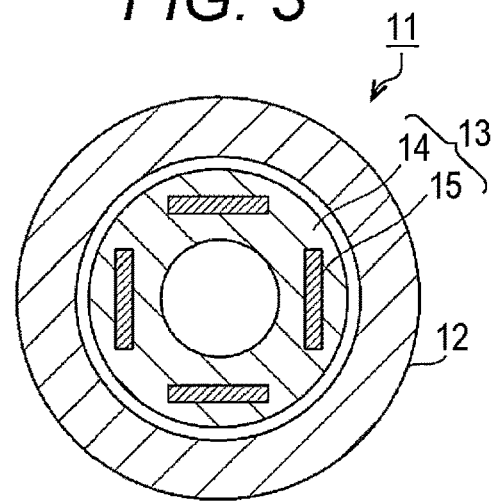
FIG. 3 is a cross-sectional view illustrating a permanent magnet motor.

In a permanent magnet motor 11 illustrated in FIG. 3, a rotor 13 is disposed inside a stator 12. A permanent magnet 15, which is the permanent magnet of the first embodiment, is disposed in an iron core 14 of the rotor 13. By using the permanent magnet of the first embodiment, it is possible to achieve high efficiency, size reduction, cost reduction, and the like of the permanent magnet motor 11 based on the properties and the like of each permanent magnet. In addition, the permanent magnet can also be inserted into a flux barrier portion of a synchronous reluctance motor. Therefore, a power factor of the synchronous reluctance motor can be increased.

Figure 4:
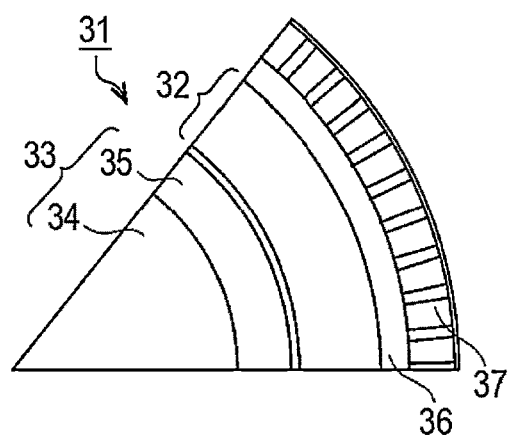
FIG. 4 is a schematic view illustrating a part of a cross section of the permanent magnet motor.

FIG. 4 is a schematic view illustrating a part of a cross section of the permanent magnet motor in the present embodiment. The permanent magnet motor according to the present embodiment includes a stator 32 and a rotor 33, and the stator 32 or the rotor 33 includes the permanent magnet according to the first embodiment. In a permanent magnet motor 31 illustrated in FIG. 4, the rotor 33 is disposed inside the stator 32. A permanent magnet 35, which is the permanent magnet of the first embodiment, is disposed on a surface of an iron core 34 of the rotor 33. A housing 36 and a cooling fin 37 are disposed outside the stator 32.

Since the permanent magnet motor includes the permanent magnet according to the first embodiment, the heat resistance of the permanent magnet is enhanced, and a motor system can be reduced in size and weight by adopting an air cooling system.

[B] Generator

Figure 5:
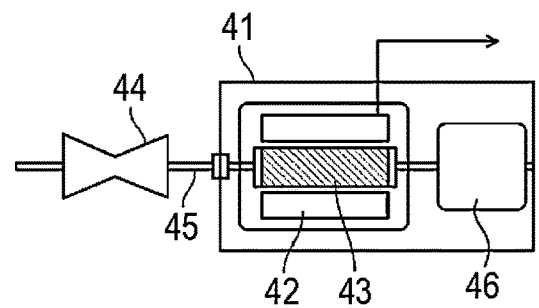
FIG. 5 is a schematic view illustrating a generator.

FIG. 5 is a schematic view illustrating a generator (power generator) according to the present embodiment. A generator 41 illustrated in FIG. 5 includes a stator 42 using the permanent magnet. A rotor 43 disposed inside the stator 42 is connected to a turbine 44 provided at one end of the generator 41 via a shaft 45. The turbine 44 is rotated by, for example, a fluid supplied from the outside. Note that, instead of the turbine 44 rotating by the fluid, it is also possible to rotate the shaft 45 by transmitting dynamic rotation such as regenerative energy of a vehicle such as an automobile. Various known configurations can be adopted for the stator 42 and the rotor 43.

The shaft 45 is in contact with a commutator (not illustrated) disposed on a side of the rotor 43 opposite to the turbine 44, and an electromotive force generated by the rotation of the rotor 43 is boosted to a system voltage to be transmitted as an output of the generator 41 via an isolated phase bus and a main transformer (not illustrated). The generator 41 may be either a normal generator or a variable flux generator. Note that the rotor 43 is electrically charged by static electricity from the turbine 44 or a shaft current accompanying power generation. Therefore, the generator 41 includes a brush 46 for discharging the charged electricity of the rotor 43.

As described above, effects such as high efficiency, size reduction, and cost reduction can be obtained by applying the permanent magnet to the generator.

[C] Railway Vehicle

Figure 6:
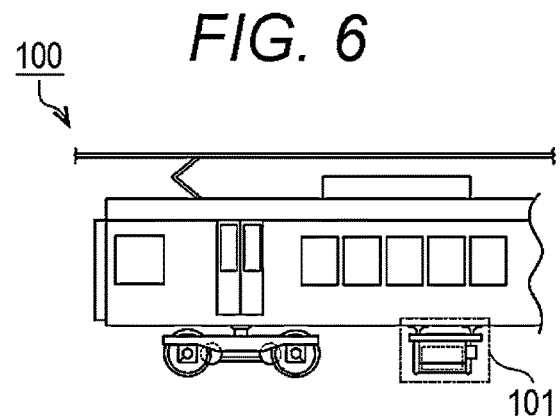
FIG. 6 is a schematic view illustrating an example of a railway vehicle.

The rotating electric machine may be mounted in, for example, a railway vehicle (an example of a vehicle) used for rail traffic. FIG. 6 is a schematic view illustrating an example of a railway vehicle 100 including a rotating electric machine 101. As the rotating electric machine 101, the motor of FIG. 3, the generator of FIG. 5, and the like can be used. In a case where the rotating electric machine is mounted as the rotating electric machine 101, the rotating electric machine 101 may be used as, for example, an electric motor that outputs a driving force by using electric power supplied from an overhead line or electric power supplied from a secondary battery mounted in the railway vehicle 100, or may be used as a generator that converts kinetic energy into electric power and supplies the electric power to various loads in the railway vehicle 100. By using a highly efficient rotating electric machine such as the rotating electric machine of the embodiment, the railway vehicle can travel with energy saving.

[D] Automobile

Figure 7:
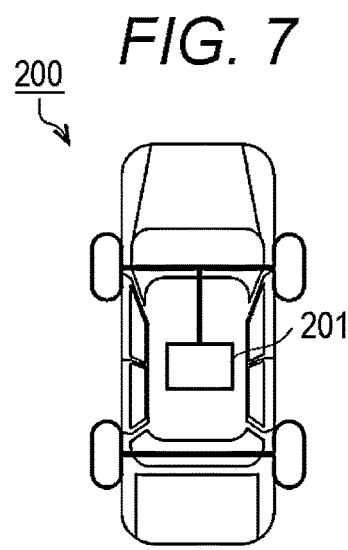
FIG. 7 is a schematic view illustrating an example of an automobile.

The rotating electric machine may be mounted in an automobile (another example of a vehicle) such as a hybrid automobile or an electric automobile. FIG. 7 is a schematic view illustrating an example of an automobile 200 including a rotating electric machine 201. As the rotating electric machine 201, the motor of FIG. 3, the generator of FIG. 5, and the like can be used. In a case where the rotating electric machine is mounted as the rotating electric machine 201, the rotating electric machine 201 may be used as an electric motor that outputs a driving force of the automobile 200, or may be used as a generator that converts kinetic energy during traveling of the automobile 200 into electric power.

[E] Aircraft

Figure 8:
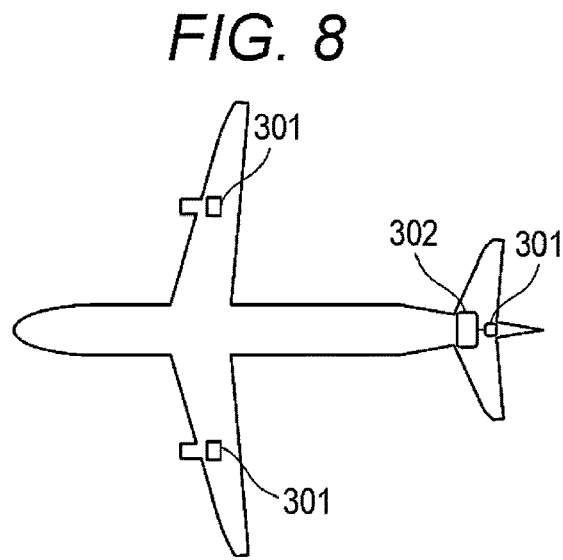
FIG. 8 is a schematic view illustrating an example of an aircraft.

The rotating electric machine may be mounted in an aircraft. FIG. 8 is a schematic view illustrating an example of an aircraft 300 including a rotating electric machine 301. A fan 302 is driven by the rotating electric machine 301 disposed at a fuselage tail portion to increase a flow rate of a fuselage flowing to the rear of the fuselage, such that propulsion efficiency of the aircraft can be increased. The motor of FIG. 3 can be used as the rotating electric machine 301 for driving the fan. In addition, the generator of FIG. 4 can be used as the rotating electric machine 301 for supplying electric power to the motor. In addition, the motor of FIG. 3 may be used instead of an engine. In addition, the rotating electric machine may be mounted in, for example, an industrial device (industrial motor), an air conditioning device (air conditioner/water heater compressor motor), a wind power generator, or an elevator (winding machine).

EXAMPLES

Hereinafter, Examples will be described, but embodiments are not limited to the Examples described below.

Examples 1 to 9

Each raw material was weighed at a predetermined ratio so as to obtain a permanent magnet having a desired composition formula, and then an alloy ingot was produced by high frequency melting. The alloy ingot was coarsely ground and then finely ground by a jet mill to prepare an alloy powder having an average particle size of 4 μm.

The obtained fine powder was pressed at a pressing pressure of 1 t in a magnetic field of 1 T to obtain a green compact. Thereafter, the obtained green compact was sintered. In the sintering, the temperature was raised to a temperature of 1,210° C. in an Ar atmosphere and held for 3 hours.

Next, a solution heat treatment was performed by holding the sintered body at a temperature of 1,190° C. for 16 hours in an Ar atmosphere, and gas cooling was performed to room temperature.

Next, the sintered body after the solution heat treatment was subjected to a heat treatment at a temperature of 830° C. for 40 hours in an Ar atmosphere as an aging treatment, and then slowly cooled to a temperature of 300° C. at a cooling rate of 0.3° C./min, and further cooled to room temperature. A permanent magnet was obtained by the above processes.

Example 10

A permanent magnet was obtained in the same manner as that of Examples 1 to 9, except that sintering was performed by raising the sintering temperature of the green compact to 1,200° C., the solution heat treatment was performed at 1,170° C., and the aging treatment temperature of the sintered body was 840° C.

Example 11

A permanent magnet was obtained in the same manner as that of Examples 1 to 9, except that the solution heat treatment was performed at 1,210° C. and the aging treatment temperature of the sintered body was 840° C.

Example 12

A permanent magnet was obtained in the same manner as that of Examples 1 to 9, except that the solution heat treatment was held at a temperature of 1,190° C. for 50 hours.

Example 13

A permanent magnet was obtained in the same manner as that of Examples 1 to 9, except that the composition was changed as shown in Table 1.

Comparative Example 1

Each raw material was weighed at a predetermined ratio so as to obtain a permanent magnet having a desired composition formula to obtain a permanent magnet in the same manner as that of Examples 1 to 9.

Comparative Example 2

Each raw material was weighed at a predetermined ratio so as to obtain a permanent magnet having a desired composition formula to obtain a permanent magnet in the same manner as that of Examples 1 to 9.

Comparative Example 3

A permanent magnet was obtained in the same manner as that of Example 1, except that the sintering was performed by raising the sintering temperature of the green compact to 1,240° C. and the solution heat treatment was performed at 1,220° C.

Comparative Example 4

A permanent magnet was obtained in the same manner as that of Example 1, except that the solution heat treatment was performed at a temperature of 1,150° C.

The compositions of the permanent magnets of Examples 1 to 13 and Comparative Examples 1 to 4 were evaluated using ICP. The results of the above measurement are shown in Table 1.

TABLE 1

| Example | Composition formula |
|---|---|
| Example 1 | $Sm_{10.7}Fe_{23.1}Zr_{2.2}Cu_{5.3}Co_{58.7}$ |
| Example 2 | $Sm_{10.8}Fe_{25.0}Zr_{2.2}Cu_{5.4}Co_{56.6}$ |
| Example 3 | $Sm_{10.5}Fe_{19.6}Zr_{2.0}Cu_{5.3}Co_{62.6}$ |
| Example 4 | $Sm_{10.8}Fe_{19.6}Zr_{2.7}Cu_{5.4}Co_{61.5}$ |
| Example 5 | $Sm_{10.7}Fe_{23.1}Zr_{3.0}Cu_{5.3}Co_{57.9}$ |
| Example 6 | $Sm_{10.9}Fe_{21.2}Zr_{2.4}Cu_{5.4}Co_{60.1}$ |
| Example 7 | $(Sm_{0.7}Pr_{0.1}Nd_{0.2})_{10.9}Fe_{23.6}Zr_{2.1}Cu_{5.4}Co_{58.0}$ |

TABLE 1-continued

| Example | Composition formula |
|---|---|
| Example 8 | $Sm_{10.9}Fe_{22.3}Zr_{2.5}Cu_{5.3}(Co_{0.98}Mn_{0.01}Cr_{0.01})_{59.0}$ |
| Example 9 | $Sm_{10.8}Fe_{22.8}(Zr_{0.8}Ti_{0.1}Hf_{0.1})_{2.6}Cu_{5.3}Co_{58.5}$ |
| Example 10 | $Sm_{10.7}Fe_{23.1}Zr_{2.2}Cu_{5.3}Co_{58.7}$ |
| Example 11 | $Sm_{10.7}Fe_{23.1}Zr_{2.2}Cu_{5.3}Co_{58.7}$ |
| Example 12 | $Sm_{10.7}Fe_{23.1}Zr_{2.2}Cu_{5.3}Co_{58.7}$ |
| Example 13 | $Sm_{10.7}Fe_{23.1}Zr_{2.0}Cu_{3.5}Co_{60.7}$ |
| Comparative Example 1 | $Sm_{10.7}Fe_{23.1}Zr_{1.5}Cu_{5.3}Co_{59.4}$ |
| Comparative Example 2 | $Sm_{10.7}Fe_{23.1}Zr_{6.0}Cu_{1.2}Co_{59.0}$ |
| Comparative Example 3 | $Sm_{10.7}Fe_{23.1}Zr_{2.2}Cu_{5.3}Co_{58.7}$ |
| Comparative Example 4 | $Sm_{10.7}Fe_{23.1}Zr_{2.2}Cu_{5.3}Co_{58.7}$ |

The residual magnetization and the coercive force of each of the permanent magnets of Examples 1 to 13 and Comparative Examples 1 to 4 were evaluated using BH-Tracer. The measurement was performed at 300° C. The average distance between the platelet phases was measured by the following method from the STEM image.

The average distance between the platelet phases was measured from the structure observation image of STEM. As the cross section of the permanent magnet, a cross section of a substantially central portion of a surface having a maximum area of a sample was used. In STEM, a region of 800 nm×1,200 nm was observed at a magnification of 100 k times. The acceleration voltage was 200 kV. In this case, a width direction in the STEM image was a direction perpendicular to the platelet phase, that is, the same direction as the c-axis. Note that the perpendicularity includes a state within ±10 degrees from a perpendicular direction (substantially perpendicular).

In the observed STEM image, dividing equally into six in an a-axis direction, five lines that had the same lengths in a c-axis direction in the STEM image were drawn at equal intervals, and intersection points of the line in the c-axis direction and the platelet phase were counted. The length in the c-axis direction in the STEM image was divided by the intersection points (the length in the c-axis direction/number of the intersection points in the STEM image) to calculate the average distance between the platelet phases for each line. Thereafter, the distances between the platelet phases on the five lines described above were averaged and taken as the average distance between the platelet phases in one observation image. The observation was performed at 10 locations that did not overlap each other, an average value of values obtained by excluding the maximum value and the minimum value of the average distance calculated in each image was obtained, and this value was taken as the average distance between the platelet phases. The results obtained by the method are shown in Table 2.

The Cu concentrations in the cell wall phases and the cell phases of the permanent magnets of Examples 1 to 13 and Comparative Examples 1 to 4 were measured by the following method.

The Cu concentrations in the cell wall phases and the cell phases were measured by composition analysis and the like using STEM-EDX. In STEM-EDX, a region of 800 nm×1,200 nm was subjected to STEM observation at a magnification of 100 k times. The acceleration voltage at this time was 200 kV. In the observed image, the cell wall phase and the cell phase were identified by STEM-EDX, and the compositions at 10 locations were arbitrarily measured and averaged to calculate the Cu concentrations in the cell wall phase and the cell phase in one observed image. The observation was performed at 10 locations that did not overlap each other, an average value of values obtained by excluding the maximum value and the minimum value of the average composition calculated in each image was obtained, and this value was taken as the average Cu concentration in the cell wall phase and the cell phase. Note that a cross section of a sample was divided into three equal parts in each of a longitudinal direction and a lateral direction, and a portion that was the center in the longitudinal direction and the lateral direction was used as a cross section of the permanent magnet. The results obtained by the method are shown in Table 2.

TABLE 2

| Example | Average distance between platelet phases [nm] | Cell wall phase Cu concentration/cell phase Cu concentration | Residual magnetization at 300° C. [T] | Coercive force at 300° C. [kA/m] |
|---|---|---|---|---|
| Example 1 | 25 | 11 | 1.05 | 700 |
| Example 2 | 24 | 9 | 1.1 | 650 |
| Example 3 | 30 | 15 | 1.0 | 950 |
| Example 4 | 20 | 12 | 1.01 | 900 |
| Example 5 | 24 | 8 | 1.07 | 670 |
| Example 6 | 22 | 10 | 1.05 | 720 |
| Example 7 | 23 | 9 | 1.02 | 600 |
| Example 8 | 28 | 6 | 1.0 | 580 |
| Example 9 | 26 | 8 | 1.01 | 660 |
| Example 10 | 28 | 7 | 1.06 | 650 |
| Example 11 | 10 | 13 | 1.04 | 850 |
| Example 12 | 11 | 10 | 1.03 | 840 |
| Example 13 | 20 | 3 | 1.06 | 500 |
| Comparative Example 1 | 42 | 2 | 1.07 | 200 |
| Comparative Example 2 | 9 | 3 | 0.9 | 300 |
| Comparative Example 3 | 32 | 3 | 1.03 | 400 |
| Comparative Example 4 | 37 | 2 | 1.07 | 150 |

As is apparent from Table 2, in Examples 1 to 13, the average distance between the platelet phases is 10 nm or more and 30 nm or less, and both the residual magnetization and the coercive force are higher than those in Comparative Examples 1 to 4. It can be seen that the coercive force is significantly decreased when the average distance between the platelet phases exceeds 30 nm. In addition, it can be seen that the residual magnetization is remarkably decreased when the average distance between the platelet phases is less than 10 nm. Furthermore, in Examples 1 to 12, the concentration of the Cu element contained in the cell wall phase is 5 times or more and 25 times or less the concentration of the Cu element contained in the cell phase, such that the coercive force can be more increased. In addition, within the above ranges, the crystal structure can be stably maintained, and thus the residual magnetization is also high.

The permanent magnet according to the present embodiment is a permanent magnet having: a composition represented by a composition formula: $R_pFe_qM_rCu_tCo_{100-p-q-r-t}$ (where, R is at least one element selected from rare earth elements, M is at least one element selected from Zr, Ti, and Hf, p is a number that satisfies 10.0 at %≤p≤14.5 at %, r is a number that satisfies 1.5 at %≤r≤5.0 at %, t is a number that satisfies 0.5 at %≤t≤9.0 at %, and q is a number that satisfies 17.0 at %≤q≤26.0 at %); and a metallic structure including a cell phase having a $Th_2Zn_{17}$ type crystal phase, a cell wall phase formed so as to partition the $Th_2Zn_{17}$ type crystal phase, and a platelet phase formed so as to intersect with a c-axis of the $Th_2Zn_{17}$ type crystal phase, in which an average distance between the platelet phases is 10 nm or more and 30 nm or less. Therefore, both high residual magnetization and a high coercive force are achieved at a high temperature.

According to the embodiment, there is provided a permanent magnet that achieves both high residual magnetization and a high coercive force at a high temperature, and a rotating electric machine, a vehicle, and an aircraft using the permanent magnet.

Note that while certain embodiments of the present invention have been described, these embodiments have been presented by way of example only, and are not intended to limit the scope of the inventions. Indeed, the novel embodiments may be embodied in a variety of other forms; furthermore, various omissions, substitutions, and changes in the form of the embodiments may be made without departing from the spirit of the inventions. The accompanying claims and their equivalents are intended to cover such embodiments or modifications as would fall within the scope and spirit of the inventions.

Hereinafter, some aspects according to the embodiment is appended.

[1] A permanent magnet having: a composition represented by a composition formula: $R_pFe_qM_rCu_tCo_{100-p-q-r-t}$ (where, R is at least one element selected from rare earth elements, M is at least one element selected from Zr, Ti, and Hf, p is a number that satisfies $10.0 \leq p \leq 14.5$ at %, r is a number that satisfies $1.5 < r \leq 4.2$ at %, t is a number that satisfies $0.5 \leq t \leq 9.0$ at %, and q is a number that satisfies $17 \leq q \leq 26$ at %); and a metallic structure including a cell phase having a $Th_2Zn_{17}$ type crystal phase, a cell wall phase formed so as to partition the $Th_2Zn_{17}$ type crystal phase, and a platelet phase formed so as to intersect with a c-axis of the $Th_2Zn_{17}$ type crystal phase, in which an average distance between the platelet phases is 10 nm or more and 30 nm or less.

[2] The permanent magnet according to [1], in which Sm is contained in an amount of 50 at % or more of the element R in the composition formula.

[3] The permanent magnet according to [1] or [2], in which 20 at % or less of Co in the composition formula is substituted with at least one element selected from the group consisting of Ni, V, Cr, Mn, Al, Si, Ga, Nb, Ta, and W.

[4] The permanent magnet according to any one of [1] to [3], in which Zr is contained in an amount of 50 at % or more of the element M in the composition formula.

[5] The permanent magnet according to any one of [1] to [4], in which a concentration of the Cu element contained in the cell wall phase is 5 times or more and 25 times or less the concentration of the Cu element contained in the cell phase.

[6] A rotating electric machine including: a stator; and a rotor, in which the stator or the rotor includes the permanent magnet according to any one of [1] to [5].

[7] The rotating electric machine according to [6], further including a cooling fin.

[8] The rotating electric machine according to [6] or [7], in which the rotor is connected to a turbine via a shaft.

[9] A vehicle including the rotating electric machine according to any one of [6] to [8].

[10] The vehicle according to [9], in which the rotor is connected to a shaft, and rotation is transmitted to the shaft.

[11] An aircraft including the rotating electric machine according to any one of [6] to [8].

What is claimed is:

1. A permanent magnet comprising:
a composition represented by a composition formula: $R_pFe_qM_rCu_tCo_{100-p-q-r-t}$ (where, R is at least one element selected from rare earth elements, M is at least one element selected from Zr, Ti, and Hf, p is a number that satisfies 10.0 at %≤p≤14.5 at %, r is a number that satisfies 1.5 at %<r≤4.2 at %, t is a number that satisfies 0.5 at %≤t≤9.0 at %, and q is a number that satisfies 17.0 at %≤q≤25.8 at %) where at % is atomic percent and "100-p-q-r-t" is a formular that represents the atomic percentage of the chemical element Co; and
a metallic structure including a cell phase having a $Th_2Zn_{17}$ type crystal phase, a cell wall phase formed so as to partition the $Th_2Zn_{17}$ type crystal phase, and a platelet phase formed so as to intersect with a c-axis of the $Th_2Zn_{17}$ type crystal phase,
wherein an average distance between the platelet phases is 10 nm or more and 30 nm or less.

2. The permanent magnet according to claim 1, wherein Sm is contained in an amount of 50 at % or more of the element R in the composition formula.

3. The permanent magnet according to claim 1, wherein 20 at % or less of Co in the composition formula is substituted with at least one element selected from the group consisting of Ni, V, Cr, Mn, Al, Si, Ga, Nb, Ta, and W.

4. The permanent magnet according to claim 1, wherein Zr is contained in an amount of 50 at % or more of the element M in the composition formula.

5. The permanent magnet according to claim 1, wherein a concentration of the Cu element contained in the cell wall phase is 5 times or more and 25 times or less the concentration of the Cu element contained in the cell phase.

6. A rotating electric machine comprising:
a stator; and
a rotor,
wherein the stator or the rotor includes the permanent magnet according to claim 1.

7. The rotating electric machine according to claim 6, further comprising a cooling fin.

8. The rotating electric machine according to claim 6, wherein the rotor is connected to a turbine via a shaft.

9. An aircraft comprising the rotating electric machine according to claim 6.

10. A vehicle comprising the rotating electric machine according to claim 6.

11. The vehicle according to claim 10, wherein the rotor is connected to a shaft, and rotation is transmitted to the shaft.

* * * * *